US012002636B2

(12) United States Patent
Lamarre

(10) Patent No.: US 12,002,636 B2
(45) Date of Patent: Jun. 4, 2024

(54) LOW PROFILE CIRCUIT BREAKER LOCK-OUT ASSEMBLY

(71) Applicant: ADDÉNERGIE TECHNOLOGIES INC., Québec (CA)

(72) Inventor: Simon Joseph Yves Lamarre, Québec (CA)

(73) Assignee: ADDÉNERGIE TECHNOLOGIES INC., Québec (CA)

( * ) Notice: Subject to any disclaimer, the term of this patent is extended or adjusted under 35 U.S.C. 154(b) by 10 days.

(21) Appl. No.: 17/723,649

(22) Filed: Apr. 19, 2022

(65) Prior Publication Data

US 2023/0290587 A1 Sep. 14, 2023

Related U.S. Application Data

(60) Provisional application No. 63/318,581, filed on Mar. 10, 2022.

(51) Int. Cl.
*H01H 21/12* (2006.01)
*H01H 21/22* (2006.01)

(52) U.S. Cl.
CPC ............ *H01H 21/12* (2013.01); *H01H 21/22* (2013.01)

(58) Field of Classification Search
CPC .......... H01H 21/12; H01H 21/22; H01H 9/22; H01H 9/02; H01H 9/28; H01H 9/283; H01H 9/20; H01H 3/20
USPC ...................................... 200/13, 43.01–43.22
See application file for complete search history.

(56) References Cited

U.S. PATENT DOCUMENTS

| | | | | |
|---|---|---|---|---|
| 5,181,602 A | | 1/1993 | Kozlowski et al. | |
| 5,349,145 A | * | 9/1994 | Kelaita, Jr. ............ | H01H 9/281 200/43.15 |
| 5,468,925 A | * | 11/1995 | Mohsen ................. | H01H 9/283 200/43.11 |

(Continued)

FOREIGN PATENT DOCUMENTS

| | | |
|---|---|---|
| CN | 211555721 | 9/2020 |

OTHER PUBLICATIONS

Accuform; Accuform/STOPOUT® Slide 'n Lock™; https://www.accuform.com/lockout-tagout/stopout-slide-n-lock; retrieved Oct. 19, 2021.

(Continued)

*Primary Examiner* — Renee S Luebke
*Assistant Examiner* — Iman Malakooti
(74) *Attorney, Agent, or Firm* — Rowand LLP

(57) ABSTRACT

An electrical panel assembly comprising at least one circuit breaker and a mounted low-profile circuit breaker lock-out assembly is disclosed. The circuit breaker lock-out assembly includes a first and second mount. The first mount is for mounting to a first end of a circuit breaker housing wall adjacent a circuit breaker switch lever and includes an outward projection having a through-hole. The second mount is for mounting to a second end of the circuit breaker housing wall and includes a pivotally attached arm that is rotatable between an unlocked and locked position in which the arm is aligned with the outward projection allowing a lock to be inserted through the projection through-hole and a corresponding hole in the arm. The arm is shaped to receive the circuit breaker switch lever and hold the lever immobile when the arm is in the locked position and the lock is inserted.

16 Claims, 8 Drawing Sheets

(56) References Cited

U.S. PATENT DOCUMENTS

| | | | | |
|---|---|---|---|---|
| 5,909,019 | A * | 6/1999 | Maloney | H01H 9/282 200/43.14 |
| 6,844,512 | B2 | 1/2005 | Benda | |
| 9,978,542 | B2 | 5/2018 | Oley et al. | |
| 2014/0262702 | A1 * | 9/2014 | Oley | H01H 9/283 200/43.11 |

OTHER PUBLICATIONS

Accuform; Accuform/STOPOUT® Low-Profile Circuit Breaker Lockout; https://www.accuform.com/lockout-tagout/STOPOUT-SIMPLE-CIRCUIT-BREAKER-LOCKOUT-KDD170; retrieved Oct. 19, 2021.

Grainger Canada; Brady EZ 480V/600V Breaker Block Kit; https://www.grainger.ca/en/product/EZ-480V-600V-BREAKER-BLOCK-KIT/p/BDY90891; retrieved Oct. 19, 2021.

* cited by examiner

LOW PROFILE CIRCUIT BREAKER LOCK-OUT ASSEMBLY

FIELD

This relates to electrical safety equipment and, more particularly, to low profile circuit breaker lock-out assemblies.

BACKGROUND

Circuit breaker locks (or lock-outs) are installed to prevent the accidental or deliberate switching on or off of certain electrical circuits. In some scenarios it is desirable that an important circuit remain on (closed), thus a lock-out may be installed on its associated circuit breaker switch. In other scenarios, it is critical to ensure that an electrical circuit remain off (open). For example, if multiple electricians are working on high voltage electrical equipment simultaneously, it becomes necessary to ensure that active circuit breaker switches remain off in order to reduce the risk of electric shock or electrocution to the workers.

Electric vehicle (EV) charging stations often consist of one or more stations each including a pedestal for connecting to a vehicle via charging cable. These pedestals commonly have a locking cabinet at their lower end containing electrical circuit breakers. EV charging station pedestal cabinets are generally space constrained due to the compact dimensions of the pedestal itself. Thus, installation of safety equipment, such as circuit breaker lock-outs, in such pedestal cabinets can be particularly challenging.

DESCRIPTION OF THE DRAWINGS

Embodiments are described in detail below, with reference to the following drawings.

Like reference numerals are used in the drawings to denote like elements and features.

DETAILED DESCRIPTION

Figure 1A:
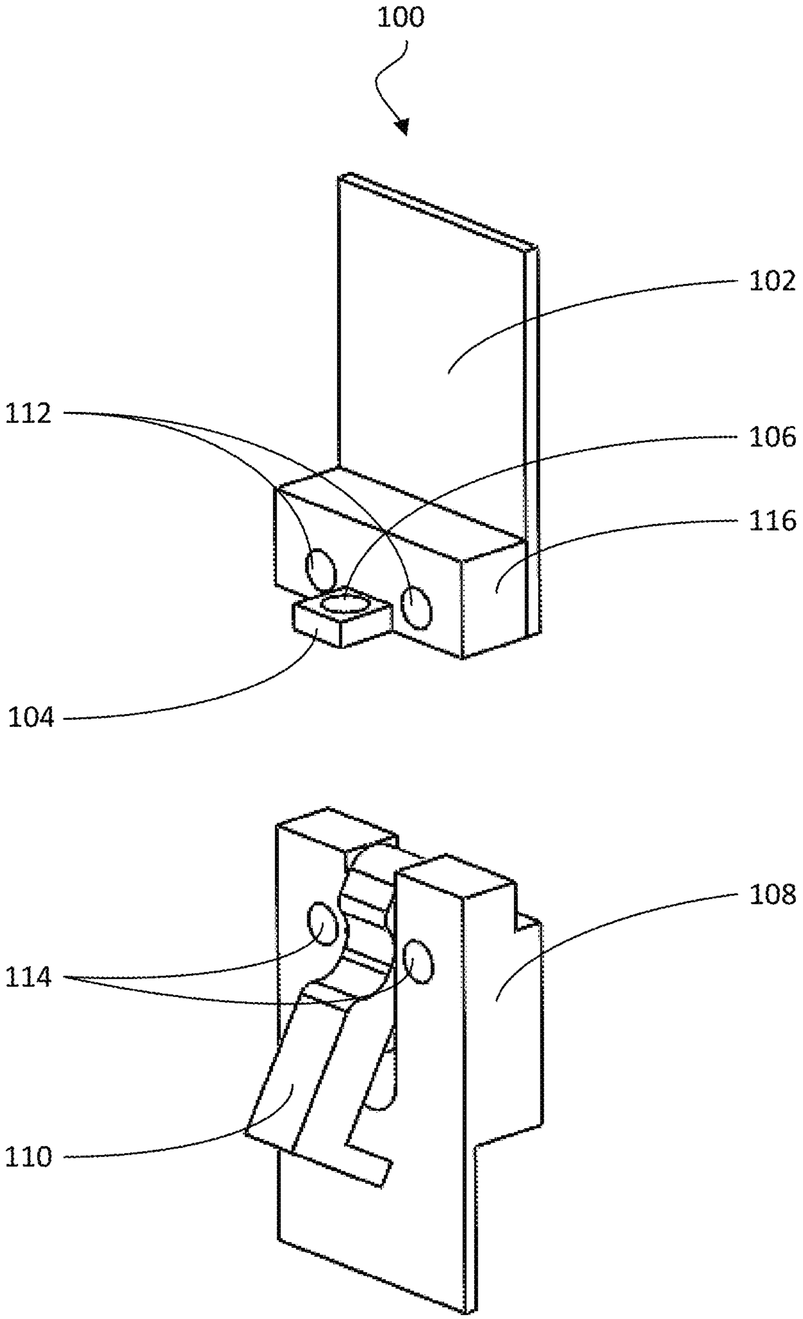
FIGS. 1A-1B are perspective views of a low-profile circuit breaker lock-out assembly in unlocked and locked positions, respectively.

According to the subject matter of the present application, there may be provided an electrical panel assembly comprising at least one circuit breaker and a low-profile circuit breaker lock-out assembly mounted to the at least one circuit breaker. The low-profile circuit breaker lock-out assembly may include a first mount for mounting to a first end of a circuit breaker housing wall adjacent a circuit breaker switch lever, the first mount including an outward projection having a through-hole. The low-profile circuit breaker lock-out assembly may also include a second mount for mounting to a second end of the circuit breaker housing wall, the second mount including a pivotally attached arm that is rotatable between an unlocked position and a locked position in which the arm is aligned with the outward projection thereby allowing a lock to be inserted through the projection through-hole and a corresponding hole in the arm. The arm may be shaped to receive the circuit breaker switch lever and hold the switch lever immobile when the arm is in the locked position and the lock is secured to the low-profile circuit breaker lock-out assembly.

In some implementations, at least the first mount or the second mount may be sized to extend beyond a wire terminal at its respective end of the circuit breaker housing wall.

In some implementations, the first mount and the second mount, respectively, may define a pair of spaced apart holes configured to align with a pair of corresponding holes in the circuit breaker housing wall.

In some implementations, at least a portion of the first mount may have greater depth than a remaining portion of the first mount, and the at least a portion of the first mount may define the pair of spaced apart holes.

In some implementations, the first mount and the second mount, respectively, may be configured for mounting to the circuit breaker housing wall by means of screws or bolts through the pair of spaced apart holes and received in the pair of corresponding holes.

In some implementations, it may be that the pair of corresponding holes in the circuit breaker housing wall are mounting holes for mounting the at least one circuit breaker to the electrical panel assembly.

In some implementations, the second mount may define a cut-out channel partially along its length, and the arm may be pivotally attached in the cut-out channel.

In some implementations, the arm may be rotatable to be at least partially positioned within the cut-out channel when the arm is in the unlocked position In some implementations, it may be that the outward projection is oriented such that the orientation of its through-hole matches an orientation of the corresponding hole in the arm when the arm is in the locked position In some implementations, a recess of the arm may be configured to hold the circuit breaker switch lever in an off position when the arm is in the locked position According to the subject matter of the present application, there may be provided a low-profile circuit breaker lock-out assembly comprising a first mount and a second mount. The first mount may be for mounting to a first end of a circuit breaker housing wall adjacent a circuit breaker switch lever, the first mount including an outward projection having a through-hole. The second mount may be for mounting to a second end of the circuit breaker housing wall, the second mount including a pivotally attached arm that is rotatable between an unlocked position and a locked position in which the arm is aligned with the outward projection thereby allowing a lock to be inserted through the projection through-hole and a corresponding hole in the arm. It may be that the arm is shaped to receive the circuit breaker switch lever and hold the switch lever immobile when the arm is in the locked position and the lock is secured to the low-profile circuit breaker lock-out assembly.

In some implementations, at least the first mount or the second mount may be sized to extend beyond a wire terminal at its respective end of the circuit breaker housing wall.

In some implementations, the first mount and the second mount, respectively, may define a pair of spaced apart holes configured to align with a pair of corresponding holes in the circuit breaker housing wall.

In some implementations, at least a portion of the first mount may have greater depth than a remaining portion of the first mount.

In some implementations, the at least a portion of the first mount may define the pair of spaced apart holes.

In some implementations, the first mount and the second mount, respectively, may be configured for mounting to the circuit breaker housing wall by means of screws or bolts through the pair of spaced apart holes and received in the pair of corresponding holes.

In some implementations, the second mount may define a cut-out channel partially along its length, and wherein the arm may be pivotally attached in the cut-out channel.

In some implementations, the arm may be rotatable to be at least partially positioned within the cut-out channel when the arm is in the unlocked position.

In some implementations, it may be that the outward projection is oriented such that the orientation of its through-hole matches an orientation of the corresponding hole in the arm when the arm is in the locked position.

In some implementations, a recess of the arm may be configured to hold the circuit breaker switch lever in an off position when the arm is in the locked position.

Other aspects and features of the present application will be understood by those of ordinary skill in the art from a review of the following description in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1B:
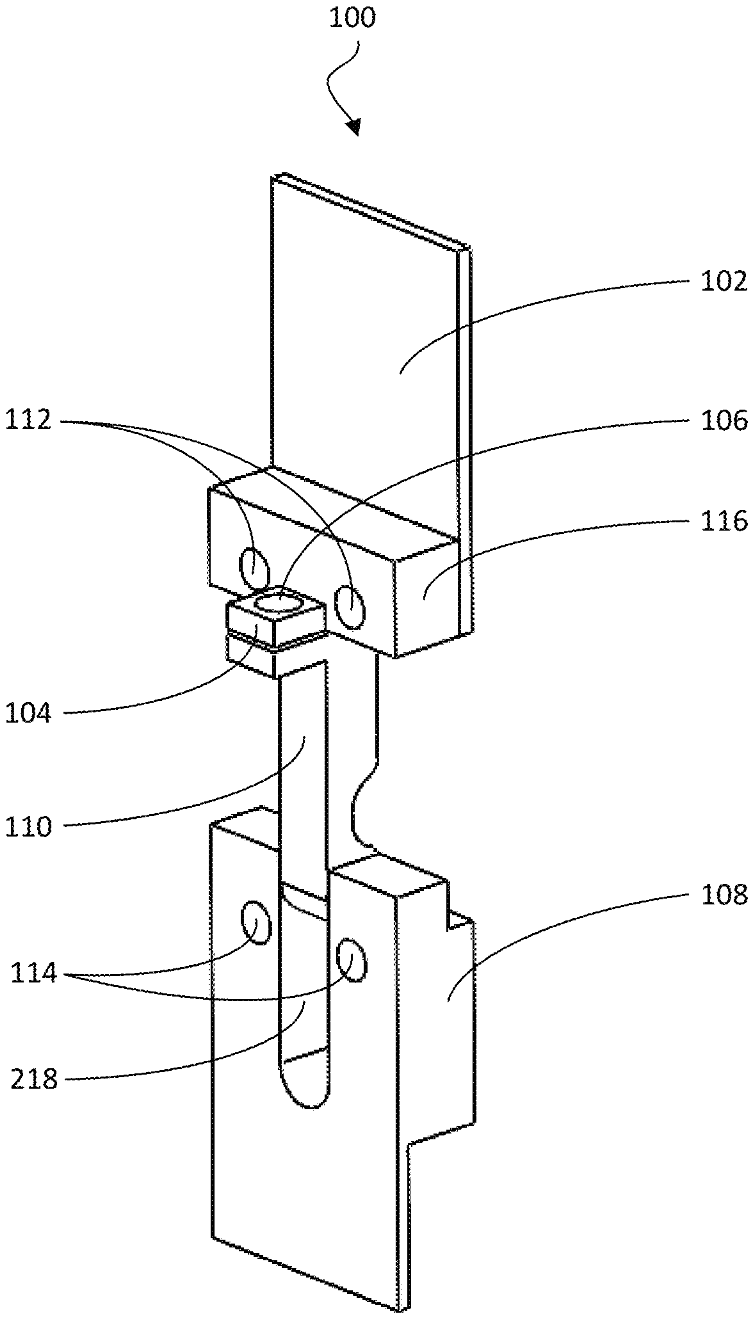

Reference is first made to FIGS. 1A and 1B depicting perspective views of a low-profile circuit breaker lock-out assembly 100, in unlocked and locked positions, respectively, in accordance with an example of the present application.

FIG. 1A illustrates a perspective view of the example low-profile circuit breaker lock-out assembly 100 in an unlocked position. By "unlocked" what is intended is that the low-profile circuit breaker lock-out assembly 100 is in a configuration which allows a switch lever of a circuit breaker (to which the assembly 100 may be mounted) freedom of movement, as opposed to a "locked" position as shown in FIG. 1B. The "locked" position may also be distinguished from the "unlocked" position in that, in the locked position, the low-profile circuit breaker lock-out assembly 100, locking features of the low-profile circuit breaker lock-out assembly 100 align to permit insertion of a lock within the low-profile circuit breaker lock-out assembly 100 to lock the low-profile circuit breaker lock-out assembly 100 in place.

The low-profile circuit breaker lock-out assembly 100 may include a first mount 102 for mounting to a first end of a circuit breaker housing wall adjacent a circuit breaker switch lever (the circuit breaker and associated components are discussed in relation to FIGS. 3A-4B). As shown, the first mount 102 may include a plate portion and an outward projection 104. The outward projection may have a locking feature. The locking feature may be a through-hole 106.

The low-profile circuit breaker lock-out assembly 100 may further include a second mount 108 for mounting to a second end of the circuit breaker housing wall. It may be that the second mount 108 includes a pivotally attached arm 110 that is rotatable between an unlocked position (as shown in FIG. 1A) and a locked position (as shown in FIG. 1B). The pivotally attached arm 110 is rotatably mounted to the second mount 108 to allow the pivotally attached arm 110 to move between locked and unlocked positions. As further discussed below, in the locked position, the arm 110 may allow a lock to be inserted into respective locking features on the first mount 102 and second mount 108 which become aligned in the locked position. For example, in the locked position, the arm 110 may align with the outward projection 104 thereby allowing a lock to be inserted through the through-hole 106 and a corresponding hole in the arm 110. While the corresponding hole in the arm 110 is not shown it is noted that such a hole is positioned at the end of the arm 110 opposite its axially rotating end in order to correspond with the through-hole 106.

When the pivotally attached arm 110 is in the unlocked position (as shown in FIG. 1A), the locking features on the first and second mounts 102, 108 remain unaligned so that a lock cannot be placed within such features.

Figure 3A:
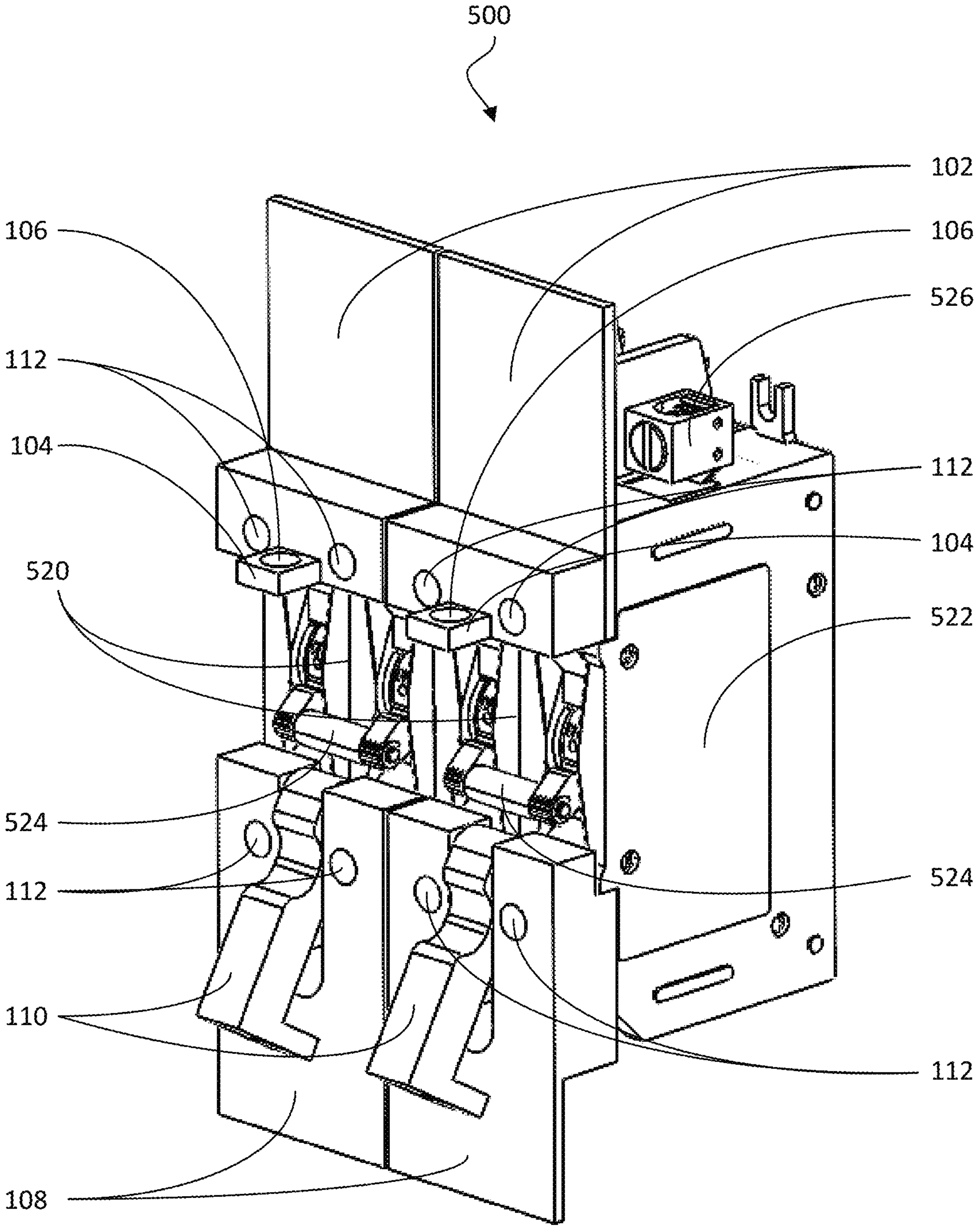
FIGS. 3A-3B are perspective views of a pair of low-profile circuit breaker lock-out assemblies in unlocked and locked positions, respectively, mounted to a pair of circuit breakers.

The first mount 102 and the second mount 108 may include one or more mounting features to allow the first mount 102 and the second mount 108 to be mounted to a circuit breaker. In some implementations, the first mount 102 and the second mount 108, respectively, may define a pair of spaced apart holes 112, 114 which are configured to align with a pair of corresponding holes in a circuit breaker housing wall (as represented in FIG. 3A). In at least some implementations, the spaced apart holes 112, 114 may be arranged to allow the first mount 102 and the second mount 108 to be mounted to a circuit breaker using front-mounting holes of a circuit breaker itself. Front-mounting holes are sometimes provided on circuit breakers to allow such circuit breakers to be mounted to an electrical panel. However, the circuit breakers that are used with the low-profile circuit breaker lock-out assembly 100 may be mounted to an electrical panel using rear mounting feature (such as holes at the back side of such circuit breakers) so that the front mounting holes are free to receive the first mount 102 and the second mount 108.

In some other implementations, at least a portion 116 of the first mount 102 has greater depth than a remaining portion of the first mount 102. That is, a portion 116 of the first mount 102 may extend outwardly from the rest of the first mount 102 as a "ledge" either integrally formed with or attached to the remaining portion of the first mount 102. This ledge or projection may be positioned at or near the locking feature of the first mount 102 and/or at or near the mounting features, such as the holes 112. In this way, the ledge or projection allows the first mount 102 to have additional thickness at the portion of the first mount 102 that is used for mounting or locking. This may help limit any tampering or unauthorized removal of the low-profile circuit breaker lock-out assembly 100 or a portion thereof. Similarly, the second mount 108 may also have a ledge, projection, or relatively thicker portion at or near the locking feature of the second mount 108 and/or at or near the mounting features, such as the holes 114.

As noted above, the ledges or protrusions on the first mount 102 and/or the second mount 108 may be either integrally formed with one or more other portions of such mounts or they may be separate parts. For example, in the illustration of FIG. 1A, the first mount 102 includes a ledge that is separate from a plate portion of the first mount 102. In this example, the second mount 108 includes a protrusion that is integrally formed with a plate portion of the second mount 108. That is, the protrusion and the plate portion are one-piece in the second mount 108 in the example of FIG. 1A but are two-piece in the first mount 102.

Accordingly, in a particular embodiment, the portion 116 of the first mount 102 defines the pair of spaced apart holes 112 (i.e., the holes 112 may be formed through opposing ends of the portion 116). The portion 116 of the first mount 102 having greater depth may provide reinforcement or added stability to the attachment points of the first mount 102 with a circuit breaker housing wall. The portion 116 of the first mount 102 may also provide enough depth to allow alignment of the outward projection 104 with the arm 110 (as shown in FIG. 1B).

FIG. 1B illustrates a perspective view of the example low-profile circuit breaker lock-out assembly 100 in a locked position. By "locked" what is intended is that the low-profile circuit breaker lock-out assembly 100 is in a configuration which holds a circuit breaker switch lever (to which the assembly 100 may be mounted) immobile, as opposed to a "unlocked" position as shown in FIG. 1A. That is, when the low-profile circuit breaker lock-out assembly 100 is in the locked position, the circuit breaker switch lever is unable to move.

In some implementations, the second mount 108 may define a cut-out channel 218 partially along its length. The cut-out channel 218 may extend from part way to most of the way along the length of the second mount 108. In one example, the cut-out channel 218 extends for a length approximately equal to a length of the arm 110. The width of the cut-out channel 218 may be greater than the width of the arm 110. Further, the second mount 108 arm 110 may be pivotally attached in the cut-out channel 218. That is, the arm 110 may be attached to one end of the second mount 108 via a small diameter rod. The arm 110 may also be rotatable about an axis defined by the rod, thus being pivotable with respect to the second mount 108. Such a configuration including a cut-out channel 218 may be advantageous due to the fact that the arm 110 may be positioned within the plane of the cut-out channel 218 in the locked and/or unlocked position. In this way, the arm 110 may be relatively flush with the rest of the assembly 100 and not add extra depth thereto.

The low-profile circuit breaker lock-out assembly 100 as presently disclosed does not require the use of a specific breaker lock or locking apparatus. Rather, any conventional lock (e.g., padlock) would suffice so long as the lock is capable of being inserted through the through-hole 106 and the corresponding hole in the arm 110.

With regard to the material make up of the low-profile circuit breaker lock-out assembly 100, any suitable material may be used according to manufacturing requirements. However, in one example, plastic or plastic-derived material is used. In this way, once the assembly 100 is installed on a circuit breaker it can remain permanently attached to it without the need for grounding. In at least some implementations, the low-profile circuit breaker lock-out assembly 100 may be constructed of a non-conductive material.

Figure 2A:
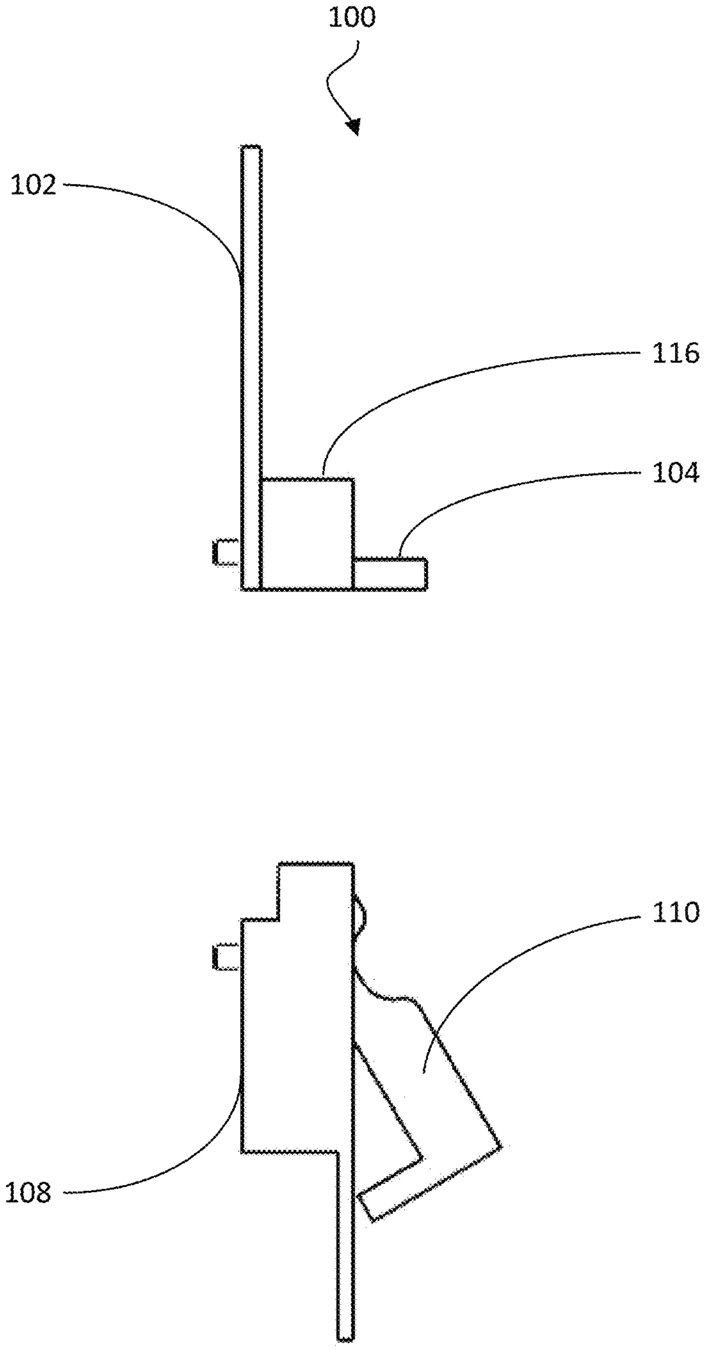
FIGS. 2A-2B are side profile views of a low-profile circuit breaker lock-out assembly in unlocked and locked positions, respectively.
Figure 2B:
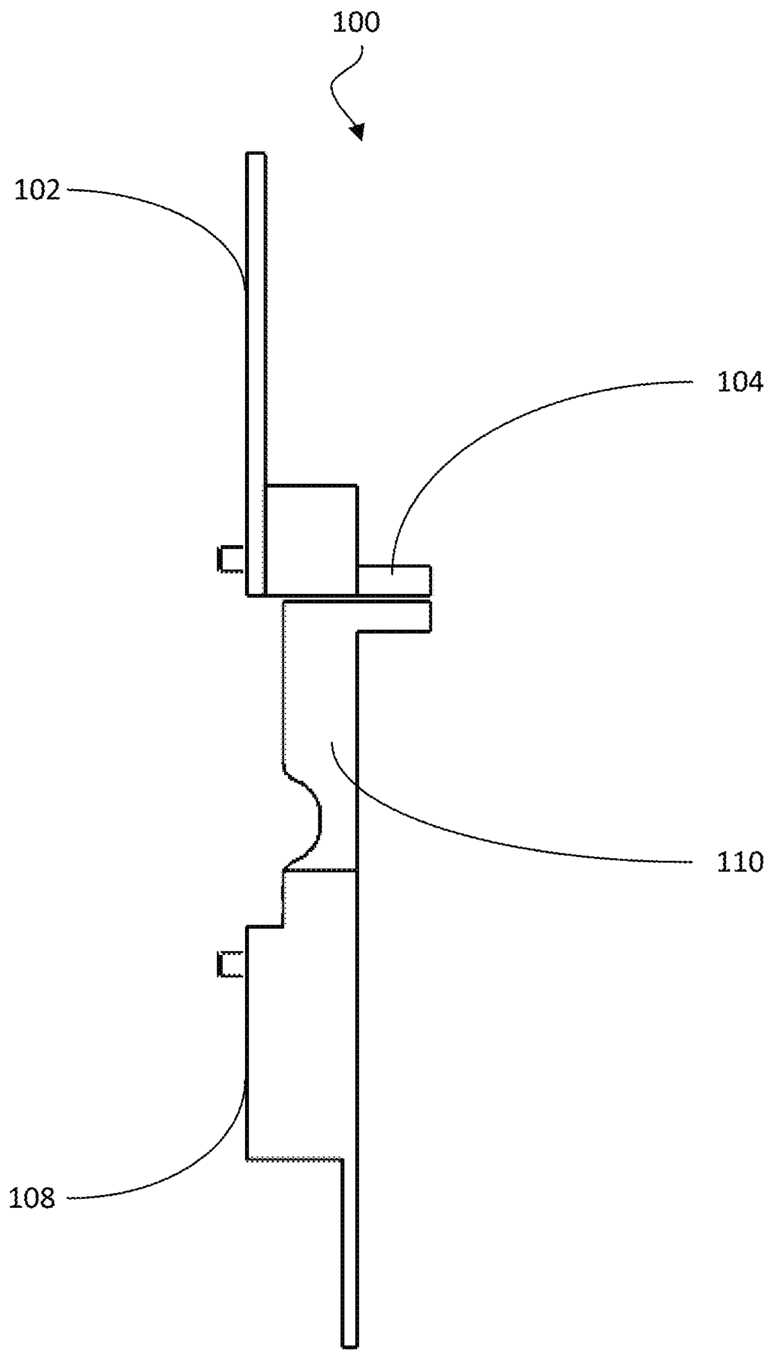

Reference is now made to FIGS. 2A and 2B depicting side profile views of a low-profile circuit breaker lock-out assembly 100 in unlocked and locked positions, respectively, in accordance with an example of the present application.

In the example embodiment of FIG. 2A, the arm 110 is rotatable to be at least partially positioned within the cut-out channel (218 of FIG. 1B) when the arm 110 is in the unlocked position. As shown, the arm 110 rests only partially within the cut-out channel 218. However, as discussed previously, the arm 110 may, in some examples, be positioned entirely within the cut-out channel 218 in the unlocked configuration in order to provide the shallowest depth possible to the assembly 100.

In the example embodiment of FIG. 2B, the outward projection 104 is oriented such that the orientation of its through-hole (not shown) matches an orientation of the corresponding hole (not shown) in the arm 110 when the arm 110 is in the locked position.

Figure 3B:
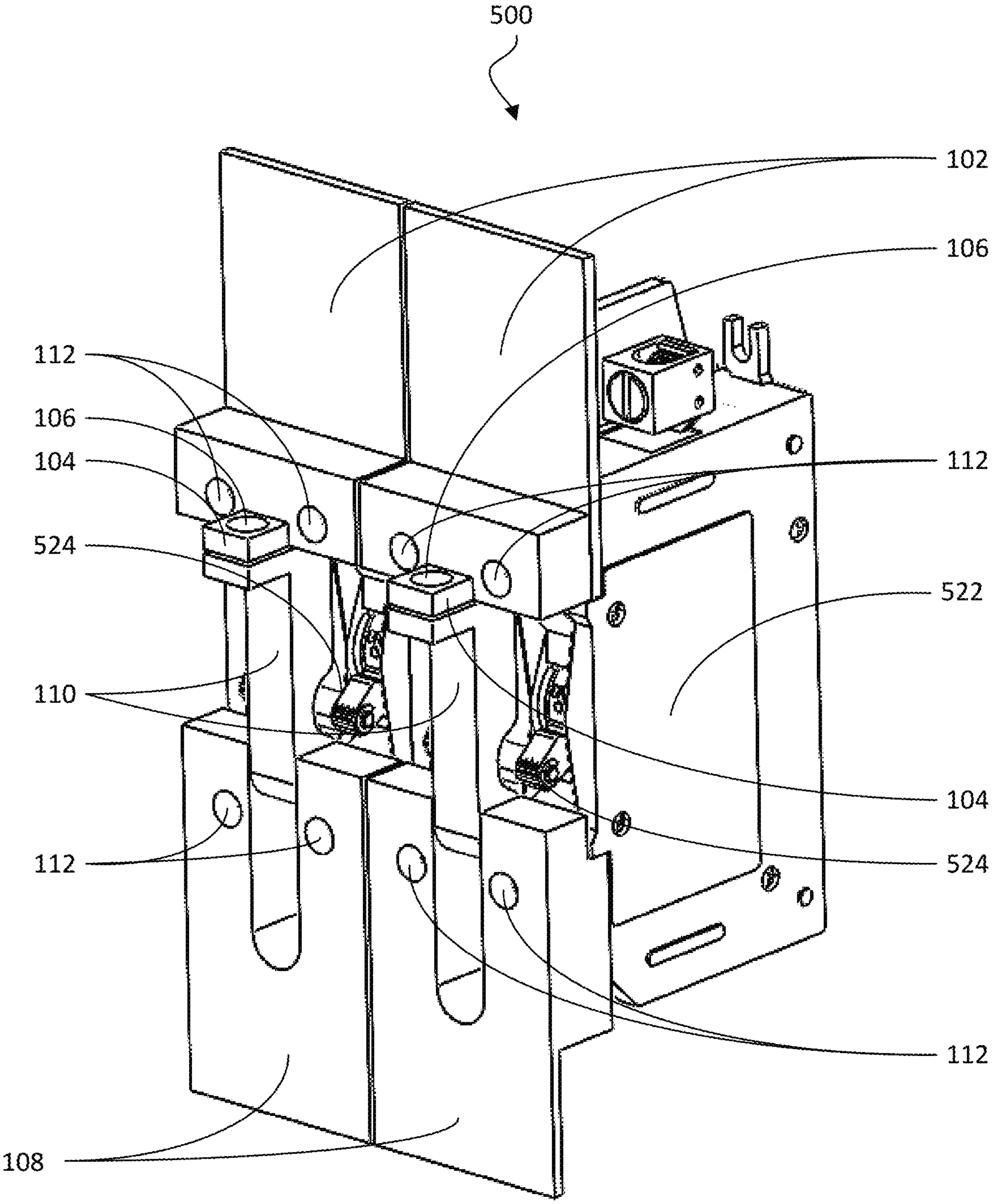

Reference is now made to FIGS. 3A-3B depicting perspective views of a pair of low-profile circuit breaker lock-out assemblies 100 in unlocked and locked positions, respectively, mounted to a pair of circuit breakers 520, in accordance with an example of the present application.

In the example embodiment of FIG. 3A, an electrical panel assembly 500 comprises two circuit breakers 520 and a low-profile circuit breaker lock-out assembly 100 mounted to each of the circuit breakers 520. The low-profile circuit breaker lock-out assembly 100 includes a first mount 102 for mounting to a first end of a circuit breaker housing wall 522 adjacent a circuit breaker switch lever 524. The first mount 102 may include an outward projection 104 having a through-hole 106. The low-profile circuit breaker lock-out assembly 100 further includes a second mount 108 for mounting to a second end of the circuit breaker housing wall 522. The second mount may include a pivotally attached arm 110 that is rotatable between an unlocked position and a locked position in which the arm 110 is aligned with the outward projection 104 thereby allowing a lock to be inserted through the through-hole 106 and a corresponding hole in the arm 110.

In the illustrated example, the first mount 102 of each low-profile circuit breaker lock-out assembly 100 is mounted at a top end of its associated circuit breaker 520 and the second mount 108 is mounted at a bottom end of its associated circuit breaker 520. The arm 110 is rotatable along a vertical plane. Conveniently, in this arrangement, the force of gravity tends to hold the arm 110 in the unlocked position so that an external force is required to place the arm 110 in the locked position.

In some implementations, at least the first mount 102 or the second mount 108 is sized to extend beyond a wire terminal 526 at its respective end of the circuit breaker housing wall 522. For example, a plate portion of one or more of the first mount 102 or the second mount 108 may extend beyond the wire terminals 526. As shown in the example embodiment of FIG. 3A, both first mount 102 and second mount 108 of the pair of lock-out assemblies 100 are sized to extend beyond top and bottom edges at their respective ends of the circuit breaker housing wall 522. In this example, however, only first mount 102 of one of the circuit breaker lock-out assemblies 100 can actually be seen as sized to extend beyond a wire terminal 526 at its respective end of the circuit breaker housing wall 522. Conveniently, in this way, the first mount 102 and/or the second mount 108 may provide protection to prevent a human from accidentally contacting the wire terminals 526.

As discussed previously, and as illustrated in the example implementation of FIG. 3B, the first mount 102 and the second mount 108, respectively, define a pair of spaced apart holes 112 configured to align with a pair of corresponding holes (not shown) in the circuit breaker housing wall 522. In some example implementations, the first mount 102 and the second mount 108, respectively, are configured for mounting to the circuit breaker housing wall 522 by means of screws or bolts through the pair of spaced apart holes 112 and received in the pair of corresponding holes (in the circuit breaker housing wall 522). In other example cases, the pair of corresponding holes in the circuit breaker housing wall 522 are mounting holes for mounting (i.e., front-mounting) the at least one circuit breaker 520 to the electrical panel assembly 500.

Figure 4A:
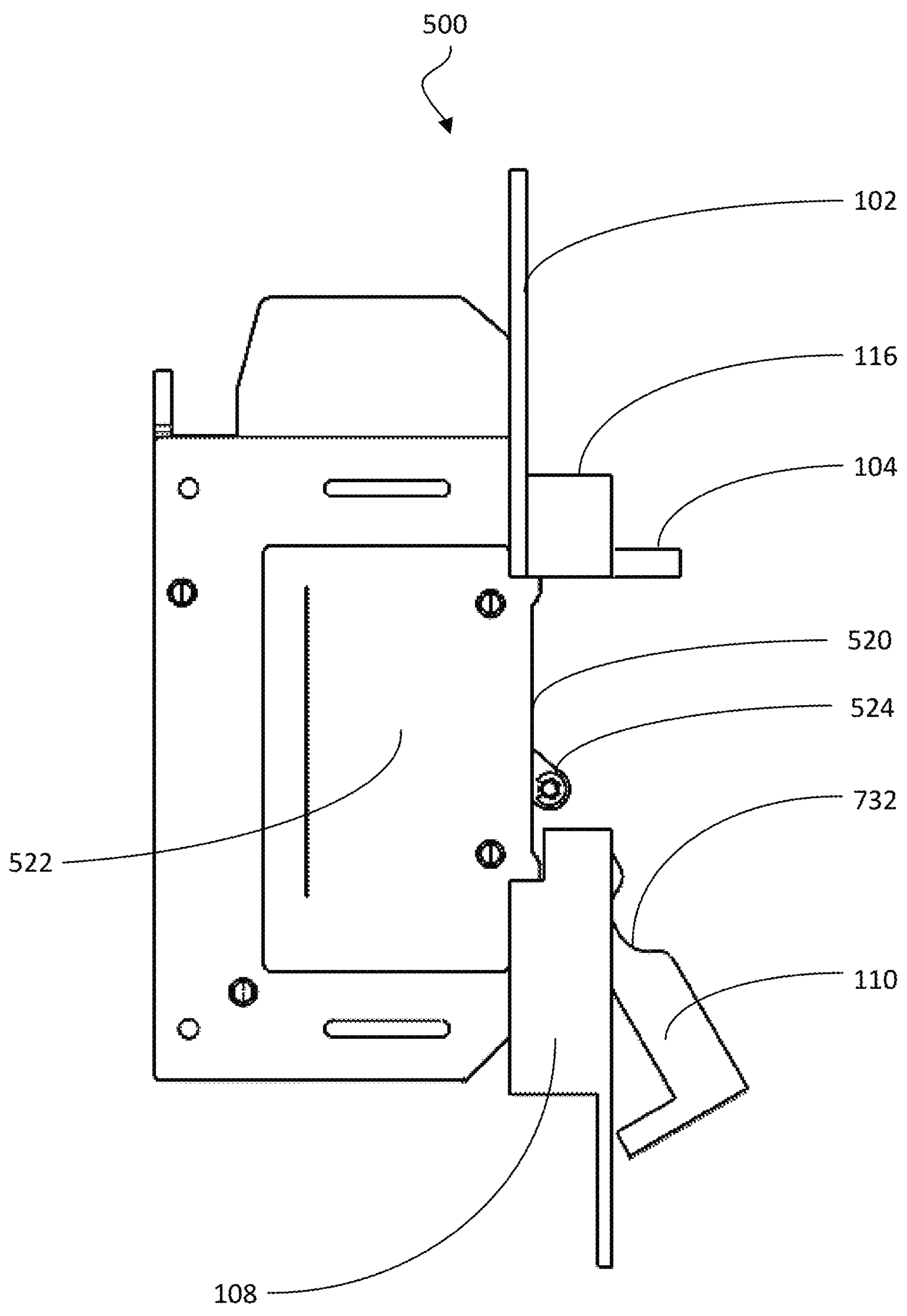
FIGS. 4A-4B are side profile views of a pair of low-profile circuit breaker lock-out assemblies in unlocked and locked positions, respectively, mounted to a pair of circuit breakers.
Figure 4B:
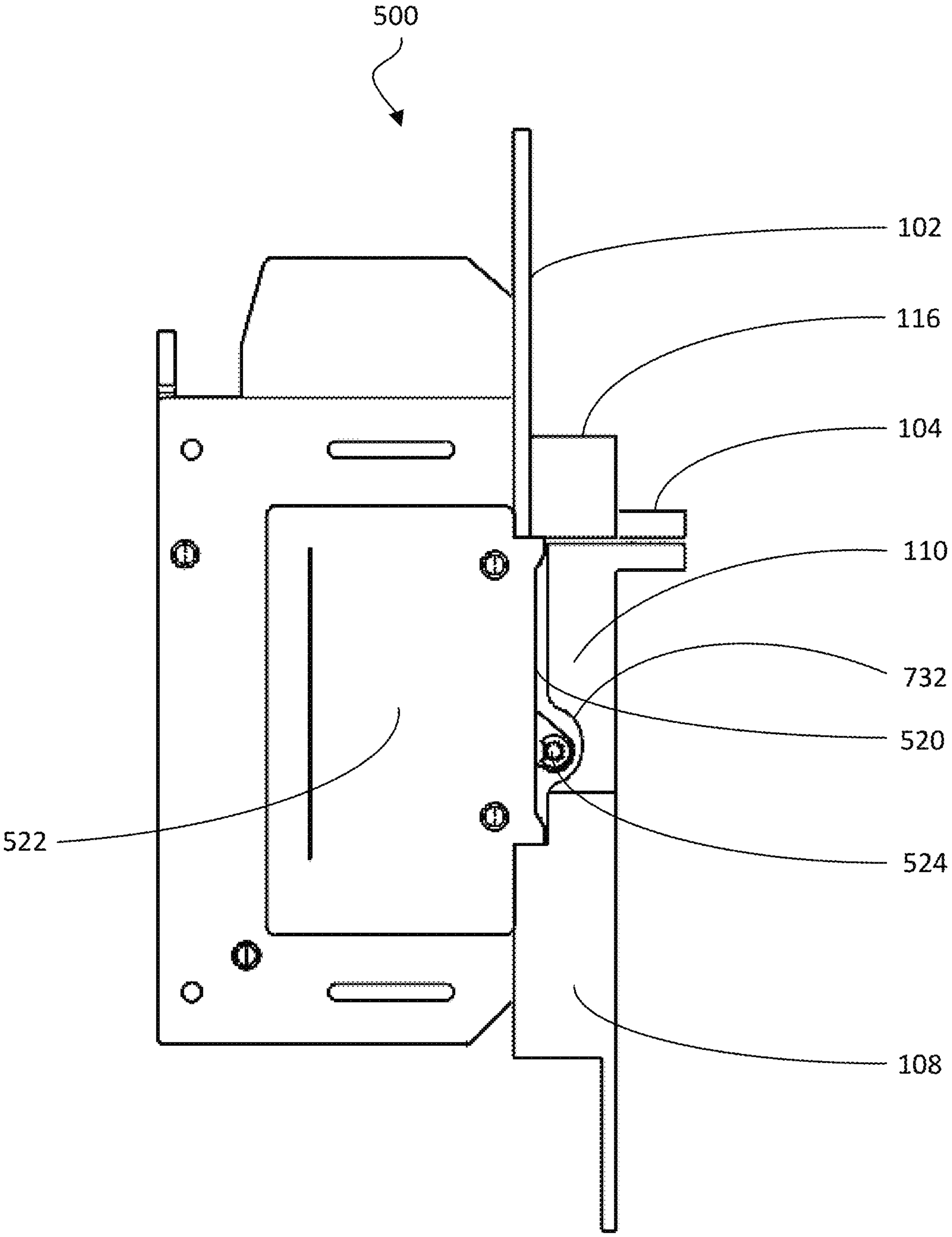

Reference is now made to FIGS. 4A-4B depicting side profile views of a pair of low-profile circuit breaker lock-out assemblies 100 in unlocked and locked positions, respectively, mounted to a pair of circuit breakers 520, in accordance with an example of the present application.

In FIG. 4A, the arm 110 of the lock-out assembly 100 may be shaped to receive a circuit breaker 520 switch lever 524 only when the circuit breaker 520 switch lever 524 is in an off position. For example, the arm 110 may include a recess 732 or other feature which allows for alignment of locking features of the lock-out assembly 100 when the circuit breaker 520 is switched off but which prevents alignment of locking features when the circuit breaker 520 is switched on. In the illustrated example, a recess 732 is provided on the arm 110 at a region of the arm 110 that corresponds with the switch lever 524 when the switch lever is in the off position. The recess 732 does not align with the switch lever 524 when the switch lever is in the on position. In this way, the recess 732 allows the locking features to align when the switch lever 524 is off but it prevents such alignment when the switch lever 524 is on.

The recess 732 may be contoured as appropriate to fit any shape or size of switch lever 524. As shown, the lock-out assembly 100 is in an unlocked configuration with the arm 110 rotated downwards (away) from the first mount 102. The arm 110 is partially positioned within the cut-out channel (as discussed previously).

In FIG. 4B, the recess 732 of the arm 110 is configured to hold the circuit breaker switch lever 524 in an off position when the arm 110 is in the locked position. That is, when the arm 110 is rotated upwards/toward the first mount 102, and the outward projection 104 through-hole 106 aligns with the corresponding hole in the arm 110, a lock may be inserted through the projection 104 through-hole 106 and the corresponding hole in the arm 110 thereby locking the circuit breaker switch lever 524 in the off position and ensuring safety for those maintaining the electrical equipment.

In this way, the recess 732 may operate to prevent a lock from being applied to the lock-out assembly 100 if the circuit breaker 520 is not switched off and it may also, once the lock is applied, prevent movement of the switch lever 524 while the lock remains applied.

Conveniently, the lock-out assembly 100 may be low profile (i.e., relatively thin in profile) as compared with traditional lock-outs and it may, therefore, be left in place even when not in use. For example, the lock-out assembly 100 may be left on a circuit breaker 520 in the unlocked position when the circuit is in ordinary operation. When an operator needs to lock out the circuit, they can simply use the lock-out assembly 100 that is already in place/mounted.

As noted, certain adaptations and modifications of the described embodiments can be made. Therefore, the above discussed embodiments are considered to be illustrative and not restrictive.

What is claimed is:

1. An electrical panel assembly comprising:

at least one circuit breaker; and a low-profile circuit breaker lock-out assembly mounted to the at least one circuit breaker, the low-profile circuit breaker lock-out assembly including:

a first mount for mounting to a first end of a circuit breaker housing wall adjacent a circuit breaker switch lever, the first mount including an outward projection having a through-hole; and a second mount for mounting to a second end of the circuit breaker housing wall, the second mount including a pivotally attached arm that is rotatable between an unlocked position and a locked position in which the arm is aligned with the outward projection thereby allowing a lock to be inserted through the projection through-hole and a corresponding hole in the arm, the second mount defining a cut-out channel partially along its length, and the arm pivotally attached in the cut-out channel, the arm being rotatable to be at least partially positioned within the cut-out channel when the arm is in the unlocked position and the low-profile circuit-breaker lock-out assembly remains mounted to the at least one circuit breaker, wherein the arm is shaped to receive the circuit breaker switch lever and hold the switch lever immobile when the arm is in the locked position and the lock is secured to the low-profile circuit breaker lock-out assembly.

2. The electrical panel assembly of claim 1, wherein at least the first mount or the second mount is sized to extend beyond a wire terminal at its respective end of the circuit breaker housing wall.

3. The electrical panel assembly of claim 1, wherein the first mount and the second mount, respectively, define a pair of spaced apart holes configured to align with a pair of corresponding holes in the circuit breaker housing wall and wherein at least a portion of the cut-out channel is positioned between one of the pairs of spaced apart holes defined in the first mount and the second mount.

4. The electrical panel assembly of claim 3, wherein at least a portion of the first mount has greater depth than a remaining portion of the first mount, and wherein the at least a portion of the first mount defines the pair of spaced apart holes.

5. The electrical panel assembly of claim 3, wherein the first mount and the second mount, respectively, are configured for mounting to the circuit breaker housing wall by means of screws or bolts through the pair of spaced apart holes and received in the pair of corresponding holes.

6. The electrical panel assembly of claim 3, wherein the pair of corresponding holes in the circuit breaker housing wall are mounting holes for mounting the at least one circuit breaker to the electrical panel assembly.

7. The electrical panel assembly of claim 1, wherein the outward projection is oriented such that the orientation of its through-hole matches an orientation of the corresponding hole in the arm when the arm is in the locked position.

8. The electrical panel assembly of claim 1, wherein a recess of the arm is configured to hold the circuit breaker switch lever in an off position when the arm is in the locked position.

9. A low-profile circuit breaker lock-out assembly comprising:

a first mount for mounting to a first end of a circuit breaker housing wall adjacent a circuit breaker switch lever, the first mount including an outward projection having a through-hole; and a second mount for mounting to a second end of the circuit breaker housing wall, the second mount including a pivotally attached arm that is rotatable between an unlocked position and a locked position in which the arm is aligned with the outward projection thereby allowing a lock to be inserted through the projection through-hole and a corresponding hole in the arm, the second mount defining a cut-out channel partially along its length, and the arm pivotally attached in the cut-out channel, the arm being rotatable to be at least partially positioned within the cut-out channel when the arm is in the unlocked position and the low-profile circuit-breaker lock-out assembly remains mounted to the at least one circuit breaker, wherein the arm is shaped to receive the circuit breaker switch lever and hold the switch lever immobile when the arm is in the locked position and the lock is secured to the low-profile circuit breaker lock-out assembly.

10. The low-profile circuit breaker lock-out assembly of claim 9, wherein at least the first mount or the second mount is sized to extend beyond a wire terminal at its respective end of the circuit breaker housing wall.

11. The low-profile circuit breaker lock-out assembly of claim 9, wherein the first mount and the second mount, respectively, define a pair of spaced apart holes configured to align with a pair of corresponding holes in the circuit breaker housing wall and wherein at least a portion of the cut-out channel is positioned between one of the pairs of spaced apart holes defined in the first mount and the second mount.

12. The low-profile circuit breaker lock-out assembly of claim 11, wherein at least a portion of the first mount has greater depth than a remaining portion of the first mount.

13. The low-profile circuit breaker lock-out assembly of claim 12, wherein the at least a portion of the first mount defines the pair of spaced apart holes.

14. The low-profile circuit breaker lock-out assembly of claim 11, wherein the first mount and the second mount, respectively, are configured for mounting to the circuit breaker housing wall by means of screws or bolts through the pair of spaced apart holes and received in the pair of corresponding holes.

15. The low-profile circuit breaker lock-out assembly of claim 9, wherein the outward projection is oriented such that the orientation of its through-hole matches an orientation of the corresponding hole in the arm when the arm is in the locked position.

16. The low-profile circuit breaker lock-out assembly of claim 9, wherein a recess of the arm is configured to hold the circuit breaker switch lever in an off position when the arm is in the locked position.

* * * * *